Jan. 24, 1967    A. H. PITCHFORD    3,299,849
AMPHIBIOUS VEHICLE
Filed June 10, 1965    6 Sheets-Sheet 1
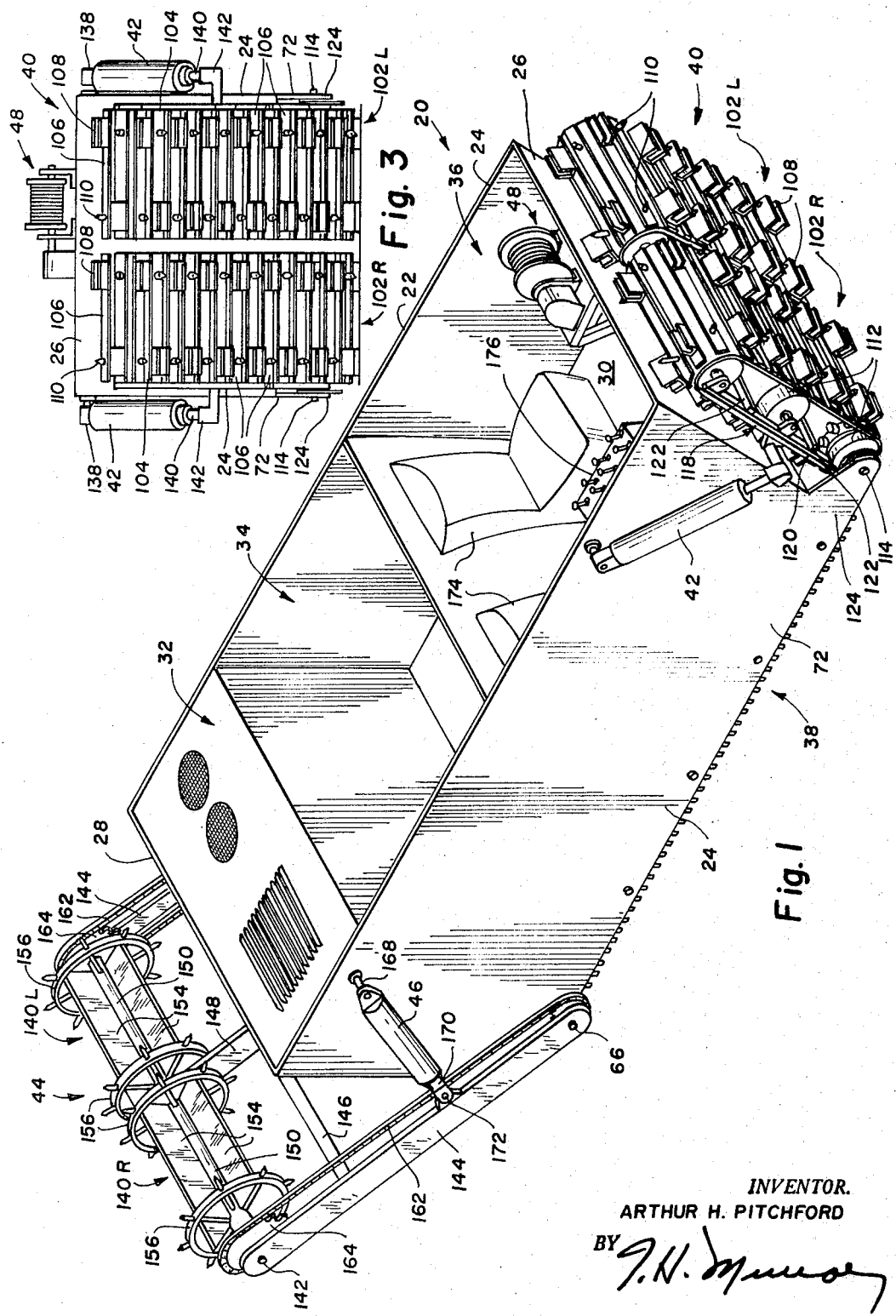
INVENTOR.
ARTHUR H. PITCHFORD
BY
ATTORNEY

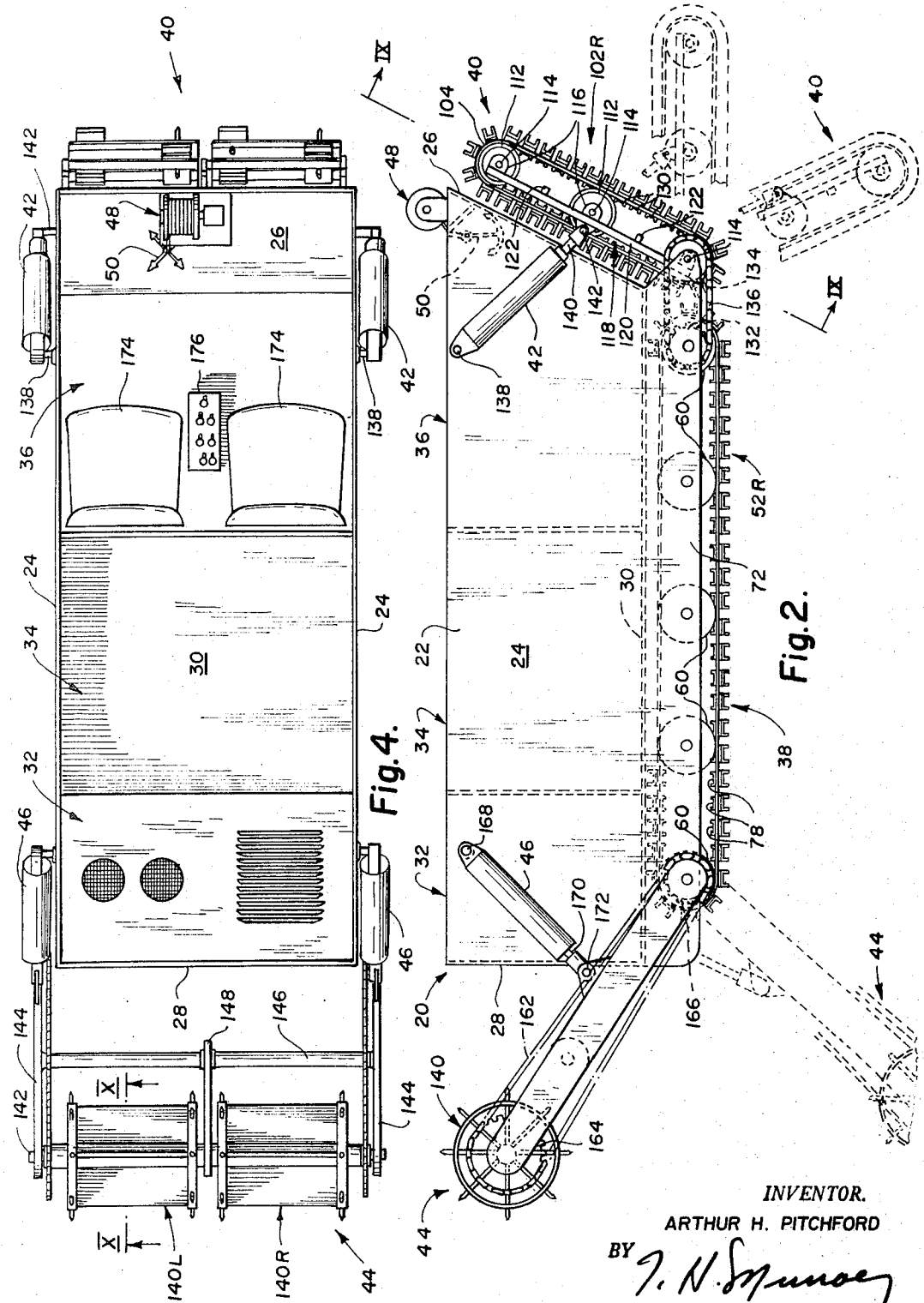

Jan. 24, 1967  A. H. PITCHFORD  3,299,849
AMPHIBIOUS VEHICLE
Filed June 10, 1965  6 Sheets-Sheet 3
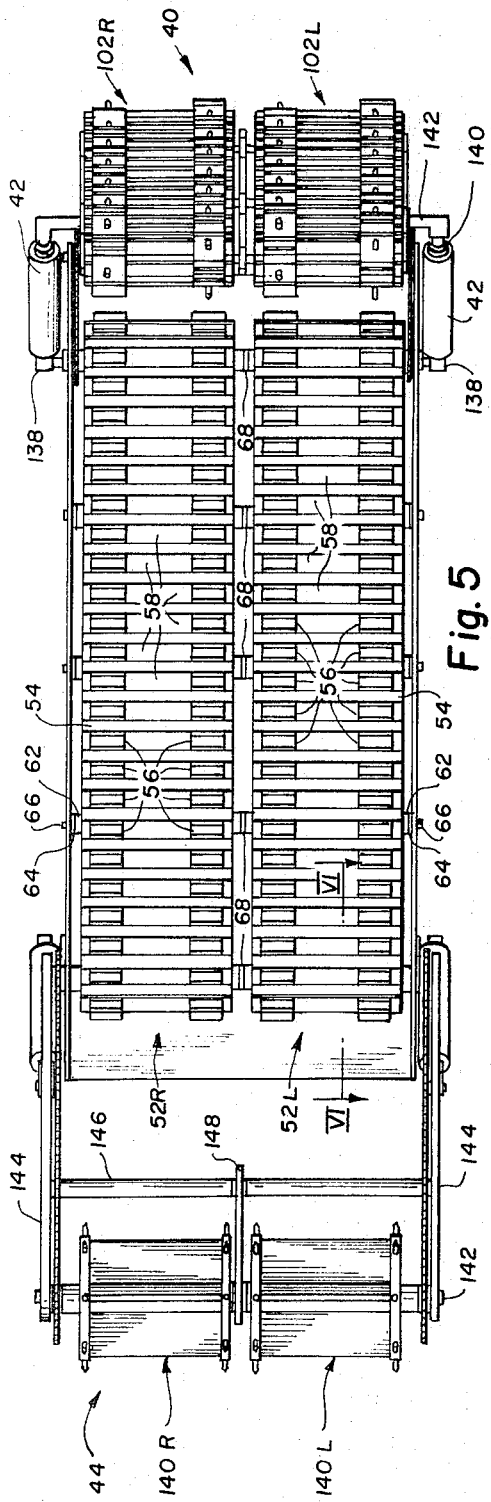
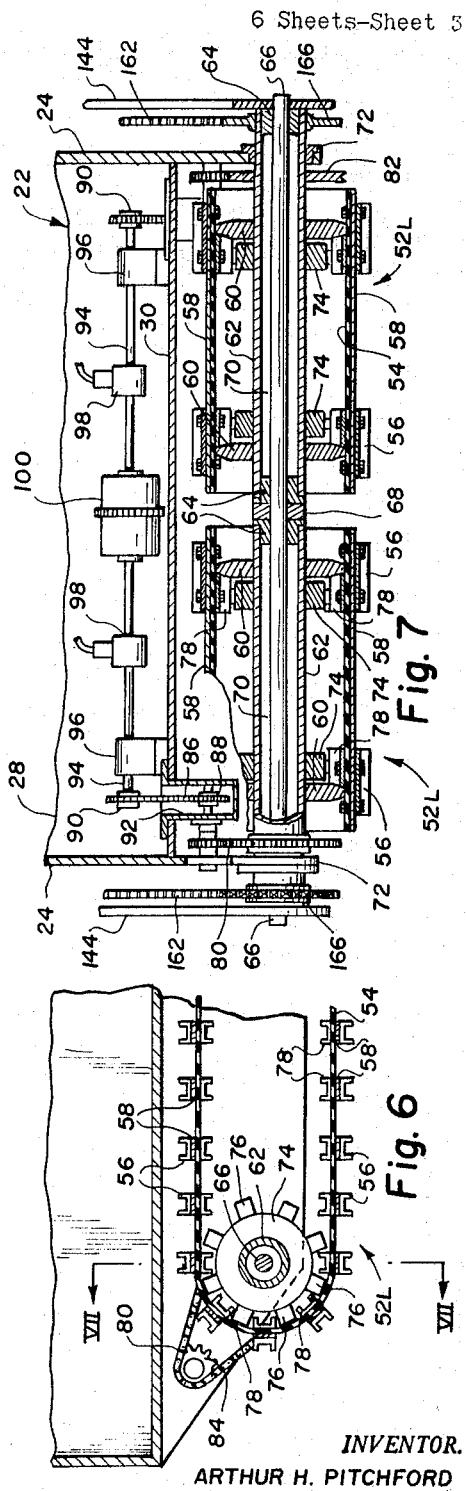
INVENTOR.
ARTHUR H. PITCHFORD
BY
his ATTORNEY

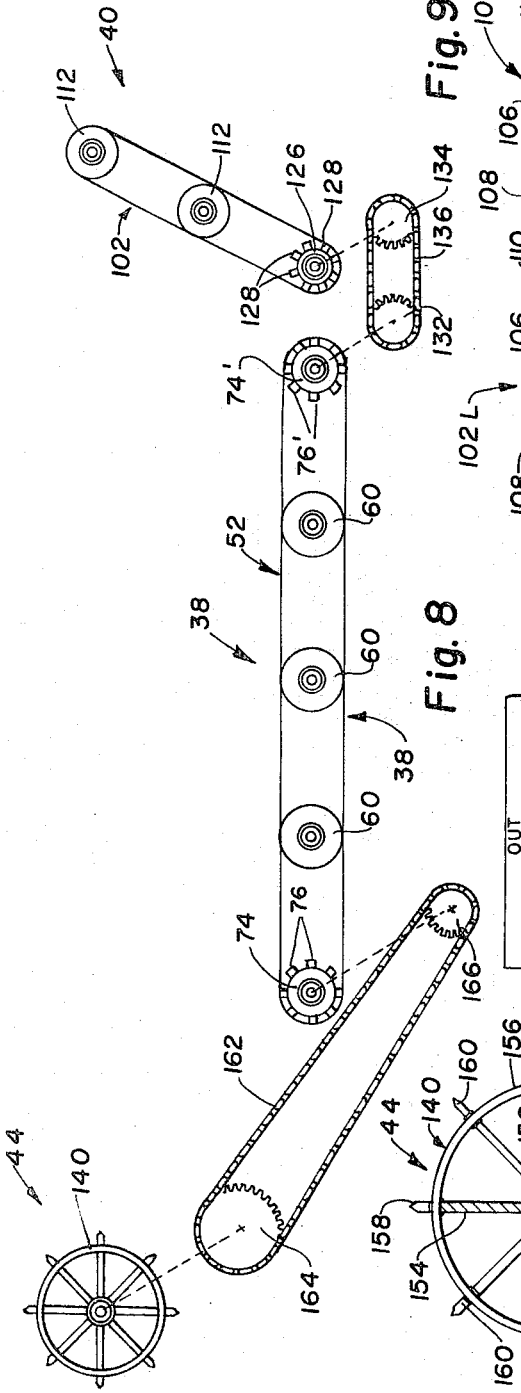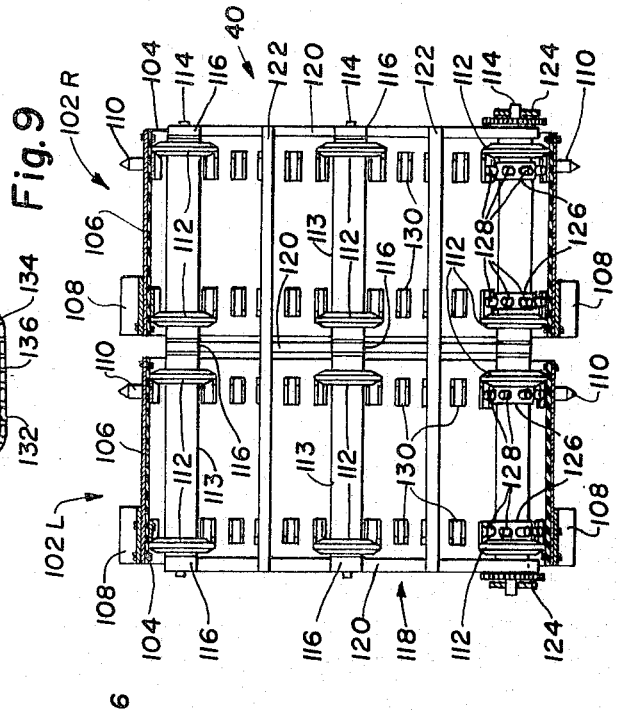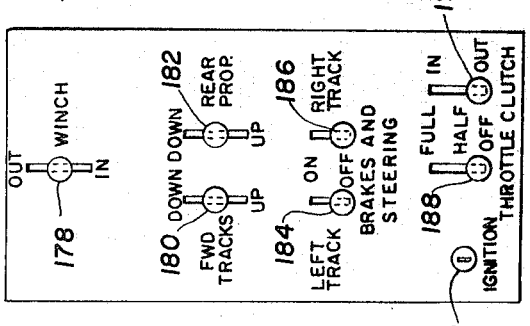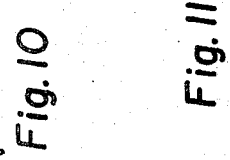

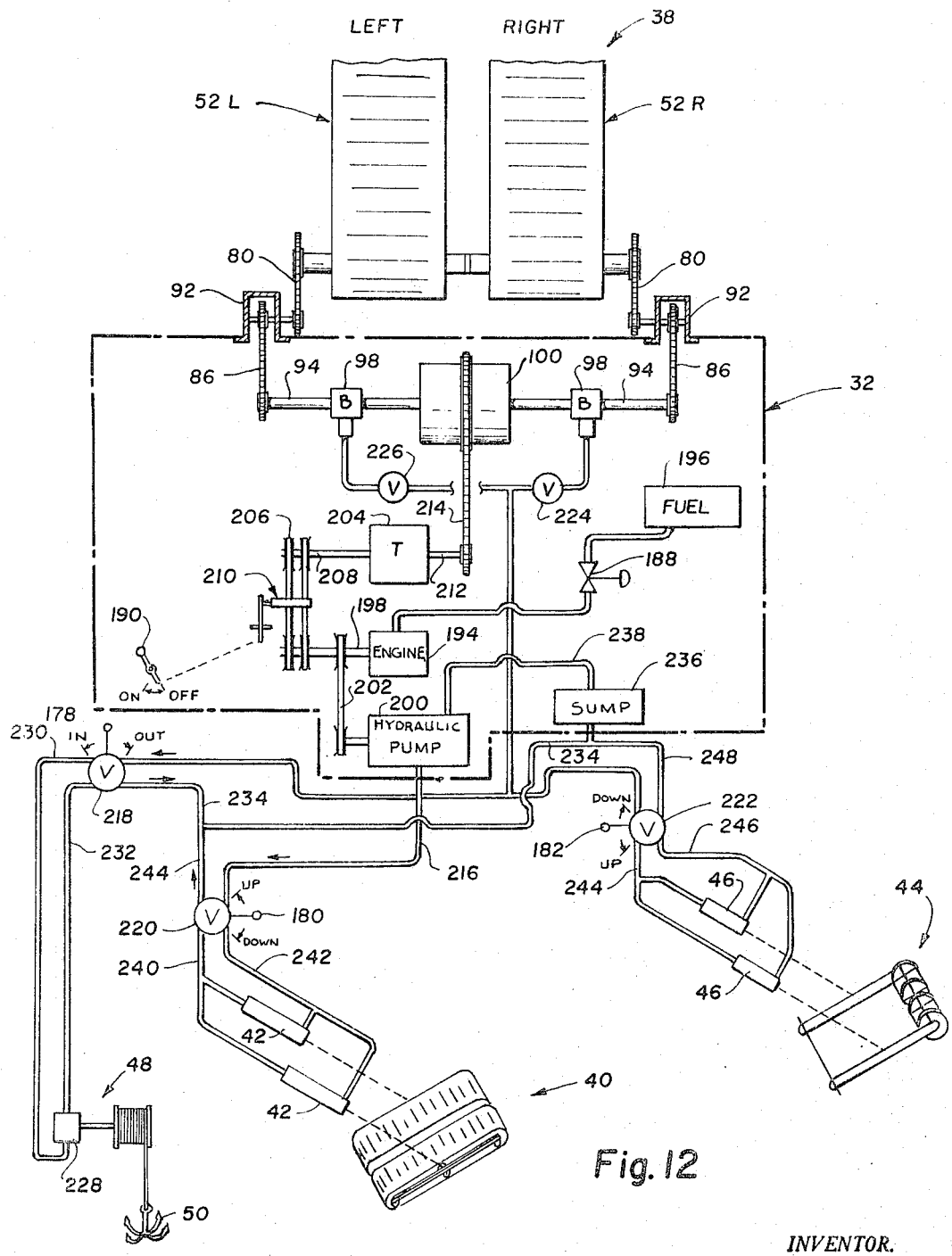

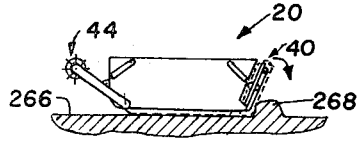
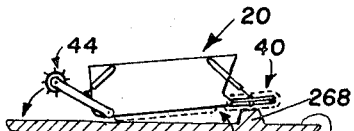
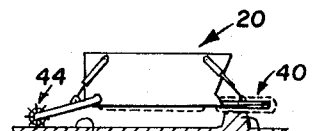
Fig. 16A  Fig. 16B  Fig. 16C
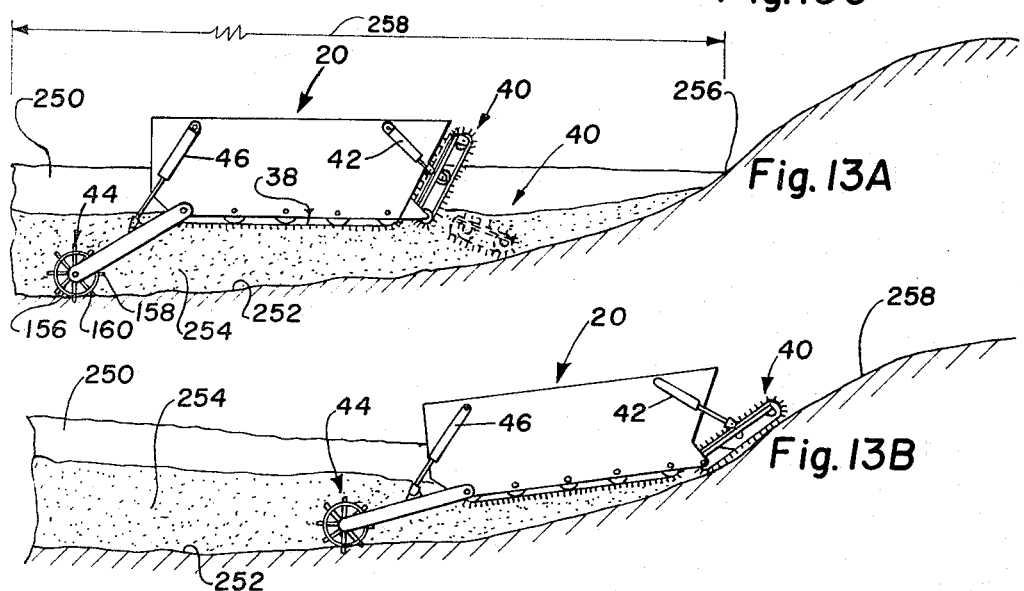
Fig. 13A
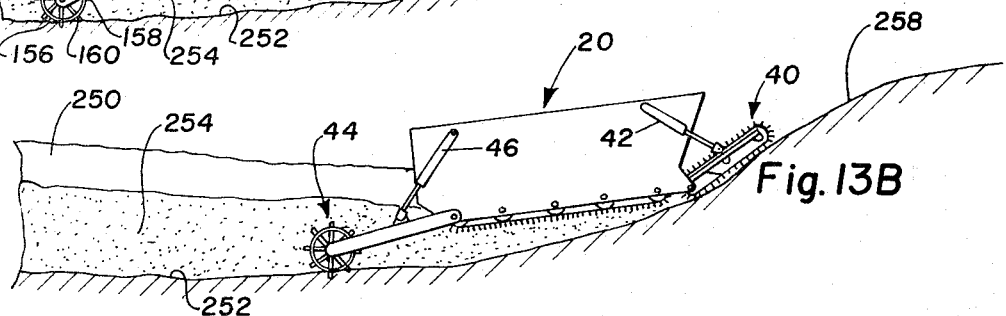
Fig. 13B
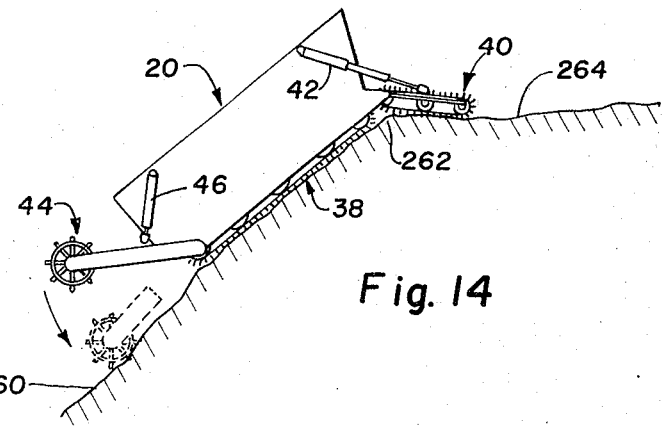
Fig. 14
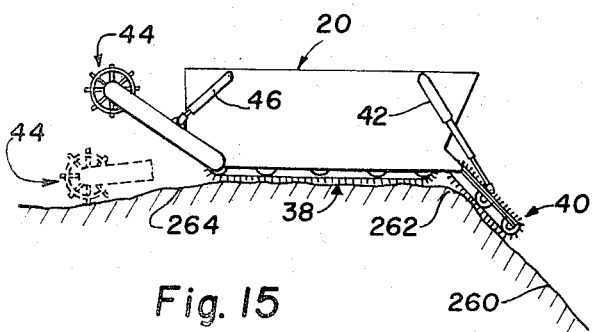
Fig. 15
INVENTOR.
ARTHUR H. PITCHFORD
BY
ATTORNEY United States Patent Office 3,299,849
Patented Jan. 24, 1967

1

3,299,849
AMPHIBIOUS VEHICLE
Arthur H. Pitchford, 5881 Lorene Drive,
Bethel Park, Pa. 15102
Filed June 10, 1965, Ser. No. 462,979
4 Claims. (Cl. 115—1)

This invention relates to amphibious vehicles, and more particularly to improved means for steerably moving amphibious vehicles through water, out of the water onto land, and overland.

As is known, there are numerous types of amphibious vehicles to be found in the prior art which are adapted to transport personnel and/or cargo over land and water. Most of these vehicles may be driven over relatively level land or through the water. However, greatest difficulty is encountered by these vehicles when they attempt to move between water and firm ground.

For example, some bodies of water have a silt-like layer deposited on the bottom which extends almost to the shoreline. There is a zone adjacent to the shoreline of these bodies of water in which the silt-like layer comes close to the surface of the water. This zone is aptly termed the "twilight zone" since almost all prior art amphibious vehicles have bogged down in this zone and were unable to move out onto the land under their own power.

Prior art amphibious vehicles have numerous other disadvantages, some or all of which render them unsuitable as a general purpose vehicle. For example, most of these vehicles cannot be driven over the crest of a relatively steep hill, either in an upward or a downward direction. This is due, for the most part, to their instability. Furthermore, most of these vehicles cannot be driven over relatively low obstacles, such as, low walls, fallen logs and the like, and must be driven around these obstacles.

It should be evident, then, that the prior art amphibious vehicles may be classified into two groups. First, those vehicles which are best suited for travel over relatively level land; and, second, those vehicles which are best suited for travel through water. Heretofore, however, no vehicle has been available which is able to travel equally as well in water, over any type of terrain, and between water and land.

There are numerous types of terrain which a good amphibious vehicle must traverse. For example, a "natural bog area" is a type consisting of wet mucky subsoil covered with a thin and relatively hard top layer of grass and roots. Another type of area is known as "rough terrain" consisting of hard grass covered soil of varying slopes. Still another type is known as "natural mud pits" consisting of extremely wet clay (muddy) with little or no vegetation. Still another type is known as a "marsh" or "swampland" area which is extremely wet and has a plant cover which does not give any significant support to the passing vehicle. Another type comprises "50–60° slopes" of hard ground with numerous shallow ruts and with no vegetation. Finally, the area described above is known as the "twilight zone." Heretofore, no single vehicle has been available which could be driven through water, between water and land, over all of the above-described types of terrain and over obstacles.

Accordingly, as an overall object, the present invention seeks to provide an amphibious vehicle adapted to transport personnel and/or cargo, which vehicle travels equally as well over land and water.

Another object of the invention is to provide an amphibious vehicle adapted to transport personnel and/or cargo, which vehicle may easily be driven through the above-defined "twilight zone."

Still another object is to provide an amphibious vehicle which is of relatively simple construction but which is exceedingly maneuverable either on land or water and in the region between land and water.

Another object of the invention is to provide an amphibious vehicle capable of traversing all of the above-described types of terrain as well as obstacles.

A further object of this invention is to provide improved drive means for moving an amphibious vehicle over water, between the water and land, and overland.

Still another object of the invention is to provide improved drive means for moving an amphibious vehicle which also serves to stabilize the vehicle during movement over the crests of relatively steep hills.

In accordance with the present invention, an amphibious vehicle is provided which is capable of transporting personnel and/or cargo through water and over various terrain. The amphibious vehicle comprises a watertight body provided with first traction means adapted to move the vehicle overland; second traction means at the forward end of the vehicle adapted to aid in moving the vehicle out of the water, up steep banks and over rough terrain; and propelling means at the rear of the vehicle adapted to propel the vehicle through water and to aid in moving the vehicle out of the water and over the land.

The second traction means is mounted at the forward end of the vehicle for movement toward and away from the ground ahead of the vehicle. Motor means is provided for displacing the second traction means into engagement with the ground ahead of the vehicle and for maintaining the second traction means engaged therewith substantially regardless of the contour of the ground ahead of the vehicle. That is to say, the attitude of the second traction means relative to the vehicle changes as the contour of the land ahead of the vehicle changes.

The propelling means is pivotally connected to the body and may be positioned in a first position wherein the propelling means moves the vehicle through water and in a second position wherein the propelling means is engaged with the ground or the bottom of a body of water to aid in moving the vehicle. Motor means is provided for positioning the propelling means at the desired position.

Suitable drive means is provided for driving the first and second traction means as well as the propelling means at substantially the same speed.

The above and other objects and advantages of the present invention will become apparent from the following detailed description by reference to the accompanying drawings, in which:

FIGURE 1 is an isometric view of the present amphibious vehicle;

FIG. 2 is a side view of the present amphibious vehicle;

FIG. 3 is a front view of the present amphibious vehicle;

FIG. 4 is a plan view of the present amphibious vehicle;

FIG. 5 is a bottom view of the present amphibious vehicle;

FIG. 6 is a cross-sectional view taken along the line VI—VI of FIG. 4;

FIG. 7 is a cross-sectional view taken along the line VII—VII of FIG. 5;

FIG. 8 is a view schematically illustrating a drive arrangement for the first and second traction means and the propelling means;

FIG. 9 is a cross-sectional view taken along the line IX—IX of FIG. 2;

FIG. 10 is a cross-sectional view taken along the line X—X of FIG. 3;

FIG. 11 is a plan view of a control console;

FIG. 12 is a view schematically illustrating a drive and control arrangement for the present amphibious vehicle;

FIGS. 13A and 13B are views illustrating the manner in which the present amphibious vehicle crosses the aforesaid "twilight zone";

FIG. 14 is a view illustrating the present amphibious vehicle climbing a relatively steep hill, preparatory to moving over the crest of the hill;

FIG. 15 is a view illustrating the present amphibious vehicle, preparatory to moving over a crest and down a relatively steep hill; and FIGS. 16A–16C are views schematically illustrating the manner in which the present amphibious vehicle moves over a low obstacle.

Amphibious vehicle—general description

Reference is now directed to FIGS. 1 and 2, wherein there is illustrated an amphibious vehicle indicated generally by the numeral 20. The vehicle 20 comprises a body 22 having side walls 24, front wall 26, rear wall 28 and a bottom wall 30. The body 22 is, of course, watertight and has its interior divided into an aft motor compartment 32, a central cargo or personnel compartment 34 and a forward driver's compartment 36.

First traction means 38 is mounted on the body 22 beneath the bottom wall 30 and is adapted to support and drive the vehicle 20 overland. The first traction means 38, as will be described, also provides for steering of the amphibious vehicle 20 when moving overland.

At the forward end of the vehicle 20 there is provided second traction means 40 which is pivotally supported on the body 22 for movement between an upwardly inclined position indicated in full lines in FIGS. 1 and 2 and a downwardly inclined position illustrated in dotted outline in FIG. 2. Motor means 42 (only one visible) is provided on each side of the body 22. The motor means 42 are connected to the second traction means 40 and serve, when actuated, to continuously urge the second traction means into driving engagement with the land ahead of the vehicle 20. The overall arrangement is such that the attitude of the second traction means 40 relative to, for example, the first traction means 38, changes as changes occur in the contour of the land ahead of the vehicle. Therefore, when the second traction means 40 is in use, some part thereof is always engaged with the ground ahead of the vehicle.

At the rear of the vehicle 20, there is provided propelling means 44 mounted on the body 22 for pivotal movement between an elevated position shown in full lines in FIGS. 1 and 2 and a downwardly inclined extreme position illustrated in dotted outline in FIG. 2. As will be described, the propelling means 44, when in the elevated position, serves to propel the vehicle 20 through water. The propelling means 44 also may be moved downwardly into engagement with the ground to the rear of the vehicle 20 wherein the propelling means serves to move the vehicle 20. Motor means 46, one on each side of the body 22, serve to position the propelling means 44.

At the top of the front wall 26 there is rigidly supported a winch 48 provided with a grappling hook 50. The winch 48 and the grappling hook 50 may be used to pull the vehicle 20 in the event that the vehicle 20 cannot be moved by the combined effort of the first and second traction means 38, 40 and the propelling means 44.

It is to be noted that the cargo or personnel compartment is located at the center of the body 22 and adjacent to the first traction means 38. This arrangement increases the stability of the vehicle 20.

First traction means 38

The first traction means 38 will now be described with reference to FIGS. 2, 5, 6 and 7. The first traction means 38 comprises a pair of flexible, endless ground engaging members 52R, 52L each of which preferably comprises a reinforced rubber belt 54 having a plurality of cleats 56 secured along the opposite sides thereof at uniformly spaced points therealong. The rubber belt 54 and the cleats 56 provide a large area of ground contact and therefore offer excellent flotation and stability characteristics to the vehicle 20. As can best be seen in FIG. 7, a stiffening plate 58 is interposed between the cleats 56 and the rubber belt 54. The stiffening plate 58 extends transversely of the rubber belt 54 and provides additional reinforcement therefor.

Each of the rubber belts 54 is supported for movement by a plurality of spaced pairs of wheels 60. As can best be seen in FIG. 7, each of these spaced pairs of wheels 60 is mounted on the tubular member 62 having a flanged bushing 64 inserted into each of its ends. A shaft 66 extends through all of the flanged bushings 64 and supports the tubular members 62 and hence the wheels 60 for rotation about its longitudinal axis. A spacer member 68 is interposed between the two tubular members 62 carried by the common shaft 66. It is to be noted that the tubular members 62, the flanged bushings 64 and the shaft 66 cooperate to define an annular space 70 which is filled with a suitable lubricant by way of a conventional grease fitting (not shown). The lubricant prevents water, sand, grit and the like from entering between the shaft 66 and bushing 64.

FIG. 7 is a cross-sectional view through the rear-most set of the wheels 60 which, as will be described, includes means for driving the rubber belts 54. The remaining sets of the wheels 60 are supported for rotation in exactly the same manner as the rearmost set of the wheels 60. However, as can be seen in FIGS. 2 and 5, the outermost flanged bushings 64 are engaged with the inner face of a skirt or extension 72 of the side walls 24. The shafts 66 project through the skirt 72 and are secured in position, for example, by means of cotter pins.

It should be evident, then, that each of the rubber belts 54 are supported to be driven independently of one another. Referring again to FIGS. 6 and 7, each of the rubber belts 54 is driven by means of a pair of spaced drive wheels 74 which are secured to the tubular member 62 and which are provided with a plurality of equiangularly spaced drive lugs 76. A plurality of uniformly spaced lug engaging members 78 are positioned on the inner surface of the rubber belts 54 and are secured to the stiffening plate 58. The overall arrangement is such that each of the drive lugs 76 is received in the space between adjacent ones of the lug engaging members 78 as illustrated in FIG. 6.

Each pair of drive wheels 74 is forcibly rotated by means of a drive chain 80 extending around a sprocket 82 secured to the tubular member 62 and a second sprocket 84 spaced therefrom. The second sprocket 84 is, in turn, driven by a second drive chain 86 extending around sprockets 88 and 90, as best shown in FIG. 7. The sprocket 88 resides within a housing 92 extending through the bottom wall 30 of the body 22. The sprocket 90 is carried on a shaft 94 extending through a bearing block 96 secured to the bottom wall 30. Hence, each of the rubber belts 54 is individually driven by means of the chains 80 and 86.

As can be seen in FIG. 7, each of the shafts 94 is provided with a hydraulically actuated brake 98 and extends to and is driven by a powered differential 100. The hydraulically actuated brakes 98 are individually operable whereby either one of the endless ground engaging members 52R or 52L may be slowed or stopped so as to turn the vehicle to the right or to the left. As will be described, the powered differential 100 is driven by means of a transmission and a motor which is preferably of the internal combustion type.

The lug engaging members 78 also serve as a means for maintaining the rubber belt 54 centered with respect to the pair of wheels 60. This is accomplished by providing each of the wheels 60 with beveled edges which engage sloped faces provided on the outboard end of each of the lug engaging members 78. The lug engaging members 78, as can be seen in FIG. 2, are so spaced that at least one of the members 78 is engaged with one of each of the wheels 60. Hence, the rubber belts 54 are guided along their entire length during their movement over the wheels 60.

Second traction means 40

The second traction means 40 will now be described with reference to FIGS. 1, 2, 3, 5 and 9. The second traction means 40 comprises a pair of flexible, endless ground engaging members 102R and 102L whose construction is similar to the construction of the flexible, endless ground engaging members 52R and 52L of the first traction means 38. That is to say, each of the flexible, endless ground engaging members 102R, 102L comprises a reinforced rubber belt 104 to which is secured a plurality of uniformity spaced stiffening members 106. Projecting outwardly of and secured to each of the stiffening plates 106 is a cleat 108 and a spike 110. As can be seen in FIGS. 1 and 3, the cleats 108 and spike 110 are alternated. It is to be noted at this time that the cleats 108 and spikes 110 are longer than the cleats 56. That is to say, the cleats 108 and the spikes 110 project outwardly in the belt 104 by a greater distance than the cleats 56. However, it is to be noted that the overall width of the endless ground engaging members 102R, 102L is the same as the overall width of the endless ground engaging members 52R, 52L of the first traction means 38. Therefore, when the second traction means 40 is positioned in alignment with the first traction means 38, as illustrated in FIG. 2, the lowermost edges of the cleats 56, the cleats 108 and the point of the spikes 110 all reside in substantially the same horizontal plane.

Referring now in particular to FIGS. 1, 2 and 9, each of the rubber belts 104 is supported on pairs of spaced wheels 112 for independent running. As in the case of the wheels 60 of the first traction means 38, the wheels 112 are supported on tubular members 113 which, in turn, are journaled to axles or shafts 114 (FIGS. 1 and 2) which extend through support blocks 116. Each of the support blocks 116 is supported on a frame 118, best shown in FIGS. 1 and 2, comprising a plurality of longitudinally extending members 120 and transversely extending members 122. The lower end of the frame 118 is pivotally mounted on forward extensions 124 of the skirt 72, by having the shaft 114 of the lowermost set of wheels 112 extend through the forward extensions 124 and being secured thereto.

The flexible, endless ground engaging members 102R, 102L of the second traction means 40 are driven in exactly the same manner as the flexible, endless ground engaging members 52R, 52L of the first traction means. Referring now to FIGS. 2, 8 and 9, it will be seen that the lowermost set of the wheels 112 of the second traction means 40 is provided with drive wheels 126 having a plurality of equiangularly spaced drive lugs 128. Each of the drive lugs 128 is received in the space between adjacent ones of lug engaging members 130 for forcibly rotating the endless ground engaging members 102R, 102L.

As can be seen in FIG. 8, the forwardmost set of the wheels 60 of the first traction means 38 is provided with drive wheels 74' having a plurality of equiangularly spaced drive lugs 76'. The lugs 76' are received in the space between the lug engaging members 78 (FIG. 2) provided on the rubber belts 54 of the first traction means 38. The first traction means 38 is employed to drive the second traction means 40 by means of sprockets 132, 134 which are connected by a drive chain 136. The sprockets 132 and 134 are rigidly connected to the tubular members supporting the drive wheels 74' and 126 respectively. It is to be noted that a set of the sprockets 132, 134 and one of the drive chains 136 is provided on either side of the body 22. Therefore, each of the endless ground engaging members 52R, 52L of the first traction means 38 is employed to drive the endless ground engaging members 102R, 102L, respectively, of the second traction means 40.

Therefore, the endless ground engaging members 52R, 102R are driven independently of the endless ground engaging members 52L, 102L. Inasmuch as the pitch diameters of the sprockets 132 and 134 are identical, the first traction means 38 and the second traction means 40 will be driven at the same speed. Furthermore, the pivot axis of the second traction means 40 is coincident with the rotational axis of the sprocket 134. Therefore, the second traction means 40 may be pivoted into any desired position without affecting the drive chain 136.

Referring now to FIGS. 1 to 5, inclusive, it will be seen that each of the motor means 42 are pivotally connected, as at 138, to the side wall 24 of the body 22. Each of the motor means 42 include a piston shaft 140 whose extreme end is pivotally connected, as at 142, to the frame 118 supporting the second traction means 40. The motor means 42 comprises a conventional telescoping, hydraulically actuated cylinder. Therefore, the motor means 42 may be placed in the compact position shown in FIG. 2 wherein the second traction means 40 is positioned adjacent to the front wall 26; and may be extended so as to position the second traction means 40 in the downwardly inclined position illustrated in dotted outline in FIG. 2.

Propelling means 44

As can be seen in FIGS. 1, 4 and 5, the propelling means 44 comprises a pair of stern wheels 140R, 140L each of which is rotatably supported on a common shaft 142 for independent rotation, as will be described. The common shaft 142 extends between and is secured to the upper ends of a pair of arms 144 whose lower ends are pivotally supported on the shaft 66 associated with the rearmost set of wheels 60 as shown in FIG. 7. The pair of arms 144 are also connected together by means of a tie member 146. An intermediate tie member 148 extends between the tie member 146 and the common shaft 142. Hence, the arms 144 move as a unit about the longitudinal axis of the shaft 66.

As can best be seen in FIGS. 1 and 10, each of the stern wheels 140R, 140L is provided with a central tubular member 150 which is journaled to the common shaft 142 by means of flanged bushings (not visible), as in the case of the tubular member 62 and shaft 66 illustrated in FIG. 7. Therefore, an annular space 152 (FIG. 10) is provided between the bushings, the tubular member 150 and the common shaft 142, which serves as a reservoir for a lubricant. Secured to and extending radially of the tubular member 150 are opposed pairs of fluid displacing elements 154 which are preferably and mutually perpendicular. Reinforcing hoops 156 are provided at each end of the fluid displacing elements 154. Projecting radially outwardly of the reinforcing hoops 156 are spikes 158 which are aligned with the fluid displacing elements 154 and spikes 160 which extend through the hoops 156 and are secured to the tubular member 150.

As will become apparent later in the specification, the stern wheels 140R, 140L have three functions. First, the fluid displacing elements 154 serve as means for propelling the vehicle 20 through a fluid, such as water, in which the vehicle 20 is floating; second, the stern wheels 140R, 140L are employed to turn the vehicle 20 in the fluid in which it is floating by stopping one of the stern wheels while the other continues to rotate; and, third, the stern wheels 140R, 140L may be pivoted downwardly into engagement with the ground to assist in moving the vehicle 20. In this respect, it should be evident that the spikes 158, 160 will penetrate into the ground thereby serving as tractive elements for moving vehicle 20 either in a forward or a backward direction.

Each of the stern wheels 140R, 140L is provided with its individual drive. As can best be seen in FIGS. 1, 2, 7 and 8, each of the stern wheels 140R, 140L is driven by a drive chain 162 traveling around sprockets 164, 166.

The sprocket 164 is secured to the tubular member 150 of the stern wheels 140R, 140L, while the sprocket 166 is secured to the tubular member 62 (FIG. 7) associated with the rearmost set of wheels 60. Hence, each of the endless ground engaging members 52 of the first traction means 38 drives one of the stern wheels 140R, 140L. It is to be noted that the size of the sprockets 164, 166 is such that the rim speed of the stern wheels 140R, 140L will be substantially the same as the linear velocity of the cleats 56 associated with the first traction means 38.

The arms 144 are pivoted about the shaft 66 by means of the motor means 46. As can best be seen in FIGS. 1 and 2, the motor means 46 has its upper end pivotally connected, as at 168 to the side wall 24 of the body 22. The motor means 46 preferably comprises a hydraulically operated cylinder having a piston shaft 170 whose extreme end is pivotally connected, as at 172, to the arm 144. If desired, the motor means 46 may comprise a conventional telescoping hydraulically operated cylinder as in the case of the motor means 42. As will be described, the motor means 46 may be actuated to position the stern wheels 140R, 140L at the elevated position illustrated in full lines in FIG. 2, at the downwardly inclined position illustrated in dotted outlines in FIG. 2, and at any desired position intermediate of these two extreme positions.

*Drive and operating controls*

As can be seen in FIGS. 1 and 4, the driver's compartment 36 is provided with a pair of seats 174 between which is provided a console 176. The console 176, illustrated on an enlarged scale in FIG. 11, has the various control elements for operating vehicle 20. Projecting upwardly from the upper face of the console 176 is an operating lever 178 for the winch 48; an operating lever 180 for the second traction means 40; an operating lever 182 for the propelling means 44; operating levers 184, 186 for the endless ground engaging members 52 of the first traction means 38; a throttle lever 188 and a clutch lever 190. Also positioned on the console 176 is an ignition lock 192. The console 176, therefore, incorporates into one convenient location all of the necessary control levers for operating the vehicle 20. The vehicle 20 may, of course, be operated from either of the seats 174.

Reference is now directed to FIG. 12, wherein the drive and associated control elements for the vehicle 20 are schematically illustrated. The aft motor compartment 32 is indicated herein by the heavy dash-dot outline. Those elements residing within the motor compartment 32 are shown within this heavy dash-dot outline.

The vehicle 20 is preferably powered by an internal combustion engine schematically illustrated at 194. A fuel tank 196 supplies fuel to the engine 194 whose rate of delivery is controlled by the throttle 188. The engine 194 has a drive shaft 198 serving to drive a hydraulic pump 200 by a belt and pulley drive 202, and serving to drive a transmission 204 by a second belt and pulley drive 206 operating on a shaft 208 of the transmission 204.

The clutch lever 190 operates a clutch device 210 which is commonly known as a "dead man's clutch." The clutch device 210 serves to tighten the belts associated with the second belt and pulley 206 thereby connecting the engine 194 in torque transmitting relation with the transmission 204. The transmission 204 includes an output shaft 212 which is coupled to the powered differential 100 by means of a driven chain 214. As explained above, the shafts 94 extending from the powered differential 100 serve to drive the right and left ground engaging members 52R, 52L by means of the drive chains 86 and 80. The hydraulically operated brakes 98 serve to slow down or stop either or both of the endless ground engaging members 52R, 52L.

The hydraulic pump 200 supplies fluid under pressure to the motor means 42, 46 and to the winch 48. Connected to the output of this hydraulic pump 200 is a main supply conduit 216 serving to supply fluid under pressure to a control valve 218 associated with the winch 48; a control valve 220 associated with the second traction means 40, a control valve 222 associated with the propelling means 44 and control valves 224 and 226 controlling the operation of the brakes 98. The control valves 218, 220 and 222 have two operating positions wherein fluid is supplied to the various control elements and a neutral position wherein no fluid flows through the valves. The valves 218, 220 and 222 are illustrated herein in their neutral position.

The control valve 218 serves to operate a reversible hydraulic motor 228 associated with the winch 48. Extending between the valve 218 and the hydraulic motor 228 are conduits 230 and 232. Extending from the opposite side of the valve 218 is a conduit 234 which comprises a return line for conveying hydraulic fluid to a sump 236. A conduit 238 extends between the sump 236 and the input of the hydraulic pump 200.

The valve 218 may be positioned by the operating lever 178 in a first position wherein fluid under pressure is communicated from the supply conduit 216 to the conduit 232 for operating the hydraulic motor 228 in a manner such that the grappling hook 50 is reeled in. The valve 218 may also be positioned by the operating lever 178 in a manner such that operating fluid under pressure is communicated from the conduit 216 to the conduit 230, in which case the hydraulic motor 228 is operated in a manner such that the grappling hook 50 may be placed at a distance from the vehicle 20.

The control valve 220 serves to operate both of the motor means 42 simultaneously. A conduit 240 extends from the control valve 220 and is connected to one end of the motor means 42. A second conduit 242 extends from the valve 220 and is connected to the opposite ends of the motor means 42. A third conduit 244 extends from the opposite end of the valve 222 to the fluid return line 234. The valve 220 may be positioned by means of the operating lever 180, so that fluid under pressure is conveyed from the supply conduit 216 to the conduit 240 causing the motor means 42 to pivot the second traction means 40 downwardly into engagement with the ground ahead of the vehicle 20. By placing the operating lever 180 in a neutral position, as illustrated, the second traction means 40 may be stopped at any position intermediate those two extreme positions illustrated in FIG. 2. Conversely, when the traction means 40 is to be elevated, the operating lever 180 positions the control valve 220 such that operating fluid is conveyed from the supply conduit 216 to the conduit 242, in which case, the motor means 42 retract their pistons shafts so as to elevate the second traction means 40 toward the front wall 26 of the vehicle 20.

The control valve 222 serves to actuate both of the motor means 46 simultaneously. A conduit 244 extends from the control valve 222 into one end of the motor means 46. A conduit 246 extends from the control valve 222 to the opposite end of the motor means 46. A third conduit 248 extends from the opposite side of the control valve 222 to the return line 234. The control valve 222 may be positioned by means of the operating lever 182 so that fluid is conveyed from the supply conduit 216 into the conduit 244 causing the motor means 46 to pivot the propelling means 44 downwardly toward the ground to the rear of the vehicle 20. Conversely, the control valve 222 may be positioned by means of the operating lever 182 so that fluid is communicated from the supply conduit 216 into the conduit 246, in which case, the motor means 46 retract their piston shafts thereby causing the propelling means 44 to be moved upwardly away from the ground to the rear of the vehicle 20.

*Operation of amphibious vehicle 20*

In FIGS. 13A, 13B, 14, 15, 16A and 16B, there are illustrated certain situations wherein amphibious vehicles of the prior art have encountered greatest difficulty in maneuvering.

In FIGS. 13A and 13B there is illustrated a body of water 250, such as a lake, having a bottom 252 covered with a slit-like material 254, extending close to a shoreline 256 of the body of water 250. Normally, there is a peripheral zone, whose width is indicated by the broken dimension line 258, in which the upper surface of the silt-like material 254 is relatively close to the upper surface of the body of water 250. This zone comprises the aforementioned "twilight zone." Prior art amphibious vehicles have found this "twilight zone" impassible.

In FIG. 13A, the present amphibious vehicle 20 is shown floating in the body of water 250. The vehicle 20 has its lower portion penetrating the silt-like material 254. The propelling means 44, if disposed in the elevated position illustrated in FIG. 2, would find it impossible to propel the vehicle 20 through the body of water 250 and the silt-like material 254. However, the operator of the vehicle 20 energizes the motor means 46 causing the propelling means 44 to be lowered down through the silt-like material 254 until the hoops 156 engage the bottom 252 of the body of water 250. It should be evident that as the propelling means 44 rotates, the spikes 158, 160 will penetrate the bottom 252 and literally push the vehicle 20 through the body of water 250 and the silt-like material 254.

When, as illustrated in FIG. 13B, the vehicle 20 has moved sufficiently close to the shoreline 256, the motor means 42 may be actuated to displace the second traction means 40 downwardly into engagement with the bottom 252, at which time, the second traction means 40 cooperates with the propelling means 44 in moving the vehicle 20 through the body of water 250 and the silt-like material 254. As the vehicle continues to move, the second traction means 40 will grip the bank 258 causing the vehicle 20 to move upwardly out of the body of water 250 and the silt-like material 254. It should be evident that the longer cleats 108 and spikes 110 provided on the second traction means 40 serve as extremely efficient tractive elements which grip the ground ahead of the vehicle 20 causing it to move thereover. Furthermore, the motor means 42 may be operated to maintain the second traction means 40 continuously engaged with the ground ahead of the vehicle 20 whereby as the contour of the bank 258 changes, the attitude of the second traction means 40 relative to the vehicle 20 also will change.

In the event the propelling means 44 does not provide sufficient power to move the vehicle 20 through the body of water 250 and the silt-like material 254, the second traction means 40 may be lowered downwardly through the body of water 250 and the silt-like material into engagement with the bottom 252, as illustrated in dotted outline in FIG. 13A. In this position, the combined effort of the propelling means 44 and the second traction means 40 will be sufficient to move the vehicle 20 out of the body of water 250.

Although not specifically illustrated, it should be evident that if the vehicle 20 is to enter the body of water 250, the propelling means 44 and the second traction means 40 may, in the manner described above, be employed to move the vehicle 20 through the body of water 250 and the silt-like material 254. When the vehicle 20 is beyond the "twilight zone," that is when the bottom of the vehicle 20 clears the upper surface of the silt-like material 254, the propelling means 44 may be elevated into the position wherein the fluid displacing elements will propel the vehicle 20 through the body of water 250.

Referring now to FIG. 14, the vehicle 20 is shown climbing a relatively steep hill 260 and is approaching the crest 262 of the hill 260. As can be seen, the second traction means 40 has been lowered into engagement with the relatively level surface 264 beyond the crest 262. As the vehicle 20 continues to move up the hill 260, the second traction means 40 bites into the level surface 264 literally pulling the vehicle 20 up over the crest 262. If found necessary, the propelling means 44 may be lowered into engagement with the hillside 260 as shown in dotted outline. With the propelling means 44 engaged with hill 260 at the rear of the vehicle 20 and the second traction means 40 in gripping engagement with the level surface 264 ahead of the vehicle 20, it should be evident that as the vehicle 20 rides over the crest 262, it will be supported at three spaced points defined by contact between the first traction means 38 and the crest 262, contact between the second traction means 40 and the level surface 264, and finally, contact between the propelling means 44 and the hillside 260. This three-point contact greatly increases the stability of the vehicle 20 as it rises over the crest 262 of the hill 260. Since the second traction means 40 and the propelling means 44 are individually displaceable into contact with the ground, the stability of the vehicle 20 may be maintained by elevating the second traction means 40 and lowering the propelling means 44 as the vehicle 20 moves over the crest 262.

Reference is now directed to FIG. 15 wherein the vehicle 20 is shown at the crest 262 preparatory to moving down the hillside 260. In this instance, the second traction means 40 is lowered into contact with the hillside 260 while the propelling means 44 is lowered into engagement with the level surface 264. It should be evident that as the vehicle 20 moves over the crest 262 down the hillside 260, the three-point contact may be maintained thereby considerably increasing the stability of the vehicle 20 as it moves over the crest 262. When the vehicle 20 is entirely on the hillside 260, the second traction means 40 and the propelling means 44 may be elevated whereby the vehicle 20 is supported by and moved solely by the first traction means 38. It should be evident, however, that the second traction means 40 may be held engaged with the hillside 260 thereby preventing the vehicle 20 from toppling forward.

As stated above, the present amphibious vehicle 20 is capable of passing over obstacles rather than having to be driven around the obstacles. Referring now to FIG. 16A, the vehicle 20 is shown moving over a land area 266 with an obstacle 268 in its path. To pass over the obstacle 268, the vehicle 20 is moved close to the obstacle 268 whereupon the second traction means 40 is lowered into engagement with the obstacle 268. The second traction means 40 is lowered further until it is substantially parallel with the first traction means 38. As shown in FIG. 16B, the forward portion of the vehicle 20 has been raised above the land 266 while the aft portion of the vehicle 20 rests on the aft portion of the first traction means 38. As illustrated in FIG. 16C, the propelling means 44 is then lowered into engagement with the land 266. The propelling means 44 is lowered further to raise the aft portion of the vehicle 20 and until the first and second traction means 38, 40 are horizontal. Thereafter, the vehicle 20 is driven forward over the obstacle 268 until the front of the vehicle 20 tilts downward into engagement with the land 266 on the other side of the obstacle 268. Thereafter, the propelling means 44 is elevated in order to clear the obstacle 268. The vehicle 20 may now be driven forward thereby passing over the obstacle 268 rather than going around it.

Although the invention has been illustrated in connection with one specific embodiment, it will be readily apparent to those skilled in the art that various changes in form and arrangement of parts may be made to suit requirements without departing from the spirit and scope of the invention.

I claim as my invention:

1. An amphibious vehicle comprising, an elongated watertight body; propelling means movably connected to the rear of said vehicle for steerably moving said vehicle through a fluid in which it is floating, said propelling means having a plurality of tractive elements supported for rotation about a common axis; means for forcibly rotating said tractive elements about said common axis; means for positioning said propelling means in a first position for propelling said vehicle through said fluid and in a second position wherein said propelling means is submerged in said fluid to the point where said tractive elements embed themselves in the ground beneath said fluid to push said vehicle through said fluid; endless track means movably supported at the forward end of said vehicle for aiding in moving said vehicle out of said fluid; motor means for continuously urging said endless track means into driving engagement with the land ahead of said vehicle whereby the attitude of said endless track means relative to said vehicle changes with changes in the contour of the land ahead of said vehicle; means for actuating said motor means when desired; traction means mounted beneath said vehicle for steerably moving said vehicle over land; and means for driving said endless track means and said traction means.

2. The combination of claim 1 wherein said propelling means additionally includes a plurality of radially extending fluid displacing elements supported for rotation about said axis; said fluid displacing elements being operable to propel said vehicle when said propelling means is disposed in said first position.

3. In an amphibious vehicle having a watertight body comprising side walls, front and rear walls and a bottom wall, the combination comprising: traction means mounted beneath said bottom wall for steerably moving said vehicle over land; propelling means at the rear of said vehicle for steerably moving said vehicle through fluids and over land, said propelling means having a plurality of radial tractive elements and a plurality of fluid displacing elements, and frame means for supporting said tractive elements and fluid displacing elements for rotation about a common axis; said frame means being pivotally supported at the rear of said body for movement to a first position wherein said fluid displacing elements are operable to propel said vehicle through a fluid and to a second position wherein said tractive elements penetrate the ground behind the vehicle to move said vehicle over land and to a third position submerged beneath said fluid wherein said tractive elements penetrate the ground beneath said fluid to move said vehicle through said fluid; motor means for positioning said propelling means at the desired position; and means for driving said traction means and said propelling means.

4. The combination of claim 3 including hoops surrounding the opposed ends of said fluid displacing elements, said tractive elements comprising spikes projecting radially outwardly of said hoops.

References Cited by the Examiner

UNITED STATES PATENTS

| 1,276,667 | 8/1918 | McDonald | 115—1 |
| 1,298,366 | 3/1919 | Macfie | 180—9.52 |
| 1,358,575 | 11/1920 | Rimailho | 180—9.32 |
| 1,592,654 | 7/1926 | Bremer | 180—9.32 |
| 2,693,162 | 11/1954 | Posche | 115—1 |
| 3,166,138 | 1/1965 | Dunn | 180—9.48 |

FOREIGN PATENTS 541,253 11/1941 Great Britain.

MILTON BUCHLER, *Primary Examiner.*

ANDREW H. FARRELL, FERGUS S. MIDDLETON,
*Examiners.*